(12) United States Patent
Moore

(10) Patent No.: US 9,336,072 B2
(45) Date of Patent: May 10, 2016

(54) EVENT GROUP EXTENSIONS, SYSTEMS, AND METHODS

(71) Applicant: Ralph Moore, Costa Mesa, CA (US)

(72) Inventor: Ralph Moore, Costa Mesa, CA (US)

( * ) Notice: Subject to any disclaimer, the term of this patent is extended or adjusted under 35 U.S.C. 154(b) by 0 days.

(21) Appl. No.: 14/617,814

(22) Filed: Feb. 9, 2015

(65) Prior Publication Data

US 2015/0226797 A1   Aug. 13, 2015

Related U.S. Application Data

(60) Provisional application No. 61/937,381, filed on Feb. 7, 2014.

(51) Int. Cl.
*G06F 11/00* (2006.01)
*G06F 11/22* (2006.01)

(52) U.S. Cl.
CPC ............... *G06F 11/00* (2013.01); *G06F 11/22* (2013.01)

(58) Field of Classification Search
CPC ... G06F 9/30018; G06F 11/00; G06F 9/3816; G06F 12/0886; G06F 7/764; G06F 9/30029; G06F 11/0736
See application file for complete search history.

(56) References Cited

U.S. PATENT DOCUMENTS

| | | | | |
|---|---|---|---|---|
| 5,479,166 A | * | 12/1995 | Read | G06F 7/505 341/65 |
| 5,781,789 A | | 7/1998 | Narayan | |
| 6,557,116 B1 | * | 4/2003 | Swoboda | G06F 11/3656 714/27 |
| 6,587,058 B1 | * | 7/2003 | Deeley | H03M 7/40 341/65 |
| 7,036,106 B1 | * | 4/2006 | Wang | G06F 9/30145 703/15 |
| 7,248,740 B2 | | 7/2007 | Sullivan | |
| 7,254,699 B2 | | 8/2007 | Shepherd | |
| 7,475,301 B2 | | 1/2009 | Adkisson | |
| 2003/0182544 A1 | * | 9/2003 | Wise | G06F 9/3867 712/300 |
| 2006/0130021 A1 | * | 6/2006 | Plum | G06F 11/3624 717/140 |
| 2011/0280314 A1 | * | 11/2011 | Sankaran | G06F 9/3877 375/240.25 |
| 2014/0289503 A1 | * | 9/2014 | Toll | G06F 9/30018 712/226 |

OTHER PUBLICATIONS

Trahay, F.; Brunet, E.; Bouksiaa, M.M.; Jianwei Liao, "Selecting Points of Interest in Traces Using Patterns of Events," in Parallel, Distributed and Network-Based Processing (PDP), 2015 23rd Euromicro International Conference on , vol., No., pp. 70-77, Mar. 4-6, 2015.*

Xiaoyu Fu; Rui Ren; Mckee, S.A.; Jianfeng Zhan; Ninghui Sun, "Digging deeper into cluster system logs for failure prediction and root cause diagnosis," in Cluster Computing (CLUSTER), 2014 IEEE International Conference on , vol., No., pp. 103-112, Sep. 22-26, 2014.*

* cited by examiner

*Primary Examiner* — Cynthia Britt

(57) ABSTRACT

An operating system uses non-bit aligned test masks to encode compound logical tests within the test mask. Generally, a bit within the test mask will indicate whether the test mask is a bit-aligned test mask or a non-bit-aligned test mask. If the system detects that the test mask in a non-bit-aligned test mask, the system will traverse the test mask to extract bit-aligned sub-masks and perform multi-level logical tests with the bit-aligned sub-masks. Such a system is particularly useful when performing a compound AND-OR logical test involving mutually exclusive event group flags.

18 Claims, 9 Drawing Sheets

```
/*
 * smx_EventFlagsTest_F() Internal Subroutine
 *
 *  Tests flags in event group vs. test_mask.
 */ u32 smx_EventFlagsTest_F(EGCB_PTR eg, u32 test_mask, u16 post_clear_mask,
            u32 timeout)
{
  u32     ttmsk;     /* task test mask */
  BOOLEAN  ef_and;    /* AND flag */
  BOOLEAN  ef_andor;   /* AND/OR flag */
  u32     sflags;    /* selected flags */
  TCB_PTR  ct = smx_ct;  /* globals optimization */ ttmsk = test_mask & 0xFFFF;

sflags = eg->flags & ttmsk;  /* select flags to test */
  ef_and = test_mask & 0x10000 ? TRUE : FALSE;
  ef_andor = test_mask & 0x20000 ? TRUE : FALSE;
  if (ef_andor)
     sflags = andor_test(sflags, ttmsk);
  else
     sflags = ((ef_and && (sflags == ttmsk)) || (!ef_and && sflags)) ? sflags : 0;

return sflags;
}
```

Figure 6A

```
/*
 * andor_test()
 *
 * Tests for and/or match of test mask and flags. Probes mask from lsb to find
 * first 1 in mask. Creates an AND term submask from it plus consecutive 1's in
 * mask. AND's term with flags and compares to term. If match, saves term
 * in save. Removes term from flags and mask. Shifts mask 1 bit right to remove
 * spacer bit and continues until either flags or mask is 0. Returns all
 * matching terms in save.
 */ u32 andor_test(u32 flags, u32 mask)
{
  u32   probe = 1;  /* probe for and/or */
  u32   term = 0;
  u32   save = 0;

while (flags && mask)
  {
    while (!(mask & probe))
    {
      probe *= 2;
    }
    while (mask & probe)
    {
      term |= probe;
      probe *= 2;
    }
    if ((flags & term) == term)
      save |= term;
    flags &= ~term;
    mask &= ~term;
    mask /= 2;
    term = 0;
  }
  return save;
}
```

Figure 6B

```
/*
* smx_EventFlagsSet()
*
* Pre-clears flags selected by pre_clear_mask in event group, then sets flags
* selected by set_mask and searches for waiting tasks with matching test_masks.
* Resumes any tasks found, then resets matching flags enabled by clear_masks
* in resumed tasks. Does not search if set_mask has no new flags -- i.e. ones
* not already set.
*/

BOOLEAN smx_EventFlagsSet(EGCB_PTR eg, u16 set_mask, u16 pre_clear_mask)
{
  u32 new_mask;
  smx_SSR_ENTER3(SMX_ID_EF_SET, eg, set_mask, pre_clear_mask);

/* pre-clear flags and set event flags */
  eg->flags &= ~pre_clear_mask;
  new_mask = set_mask & ~eg->flags; /* exclude flags already set */
  eg->flags |= new_mask;

if (new_mask)
    smx_EventFlagsSearch_F(eg);

return((BOOLEAN)smx_SSR_EXIT(TRUE, SMX_ID_EF_SET));
}
```

Figure 8 ical application 61/937381 filed on Feb. 7, 2014. This and all other extrinsic references referenced herein are incorporated by reference in their entirety.

FIELD OF THE INVENTION

The field of the invention is real-time operating system technology

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Real-Time Operating System ("RTOS") kernels used in embedded systems typically use event flags, represented by bits that are grouped together in clusters called event groups. Such event groups are frequently tested using AND and OR computations by the RTOS kernel against a bit mask. While simple AND and OR computations can be sequentially combined to perform more powerful operations, such as multiplication, division, and variable testing, it is advantageous to use more complicated base comparisons than simple AND and OR computations.

U.S. Pat. No. 5,781,789 to Narayan teaches a mask decoder circuit that receives an input bit mask that is representative of several masks, and produces submasks in parallel by selectively outputting portions of the input bit mask to an output bit mask. The mask decoder circuit is tied to a clock cycle such that as the input clock cycle increases, the output bit mask changes using a multiplexor selector. Narayan's mask decoder circuit, however, requires the multiplexor to select submasks as a function of a clock cycle. Locking a mask decoder circuit to a clock cycle may provide a method of regularly filtering through an input mask, but is rather limited.

U.S. Pat. No. 7,254,699 to Shepherd teaches a microprocessor/microcontroller architecture that re-aligns misaligned data by copying two portions of unaligned data into a first storage location and a second storage location, rotating the data in the two storage locations until the data is properly aligned, and then combines the two aligned portions of data (usually using an OR computation) into a result storage location. This allows the microprocessor/microcontroller to transmit large chunks of data with less bits by using compression algorithms that frequently misalign the data and decompression algorithms that realign data.

U.S. Pat. No. 7,475,301 to Adkisson teaches an increment/decrement circuit that receives and aligns debug data in time with a constantly incrementing counter. Such a circuit is able to perform accumulation operations between two portions of a multi-bit block. However Adkisson's circuit fails to allow a user to embed operations within the multi-bit block itself.

Thus, there remains a need for a system and method that allows a ROTS to perform more than simple AND and OR operations using a single multi-bit block.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. When referring to functions within a software application, separate modules are typically functionally coupled to one another, which means that the output of one function is configured as an input of another function.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides apparatus, systems, and methods for a non-transitory computer readable medium product to perform a compound logical test using a non-aligned event group test mask.

Throughout the following discussion, numerous references will be made regarding computer servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, or other memory). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network. The inventive subject matter is preferably embodied in a RTOS kernel that handles events received by the kernel, and acts accordingly.

The compound logical test is typically performed on an event group that is recorded in the memory of a computer system, for example a data register. Event groups comprise several adjacent bits within the memory of the computing device, and typically number an exponent of 2, such as 4 bits, 8 bits, 16 bits, 32 bits, 64 bits, 128 bits, 256 bits, 512 bits, 1024 bits, 2048 bits, or 4096 bits. While an event group could represent a number in binary form, typically an event group represents a series of states which are either on or off—true or not true. For example a 4 bit event group represented by bits ABCD which are saved as 0110 represents an event where state A is off, state B is on, state C is on, and state D is off.

In some embodiments, two or more bits of an event group are mutually exclusive flags. As used herein, "mutually exclusive flags" is a group of flags (i.e. bits) where any two of the flags are not allowed to be simultaneously set. The system preferably ensures that flags are mutually exclusive by only allowing flags to be set through functions that first reset all other mutually exclusive flags before one of the mutually exclusive flags is set. For example, where bits A and B are mutually exclusive, the system is preferably configured such that bit B must be reset to 0 when bit A is set to 1, and vice-versa. Where bits A, B, and C are mutually exclusive, the system is preferably configured such that bits B and C are both reset to 0 when bit A is set to 1. Preferably, a module is configured that accesses all mutually exclusive flags in a group simultaneously, such that when the module sets one mutually exclusive flag, the module also resets the other mutually exclusive flags.

The system also encodes one or more event group test masks into a memory of the computing device, where the event group test mask represents a compound logical test that targets specific event group flags. As used herein, a "logical test" is a comparison test using logical operators, such as AND and OR. A logical AND test between values "A" and "B" could be represented as A AND B, A&B, or simply AB, whereas a logical OR test between values "A" and "B" could be represented as A OR B or A+B. As used herein, a "compound logical test" represents a series of logical tests where the result of at least one logical test of bits is fed as an input into at least one other logical test. For example, a compound logical test of AB+CD represents a logical test where bit A is compared against bit B in an AND comparison, bit C is compared against bit D in an AND comparison, and the results of both logical tests are compared against one another in an AND comparison. Compound logical tests could have two, three, or more levels of operations. For example a compound logical test of AB+CD has two levels of operations while a compound logical test of (AB+C)+DE has three levels of operations.

A test mask preferably has at least one test flag, or mode bit, which signals to the computer system the type of logical test which will be used. Such test flags are typically one or two bits which are embedded within the test mask and are not used in the logical test itself. A simple test mask might be one where the most significant bit is not used in the logical test, but symbolizes what type of test is to be performed. For example, for an AND test flag, a 0 bit might represent an OR test and a 1 bit might represent an AND test. A more complex test mask might use two or more bits. For example in a 32 bit test mask, bit 31 (the most significant bit) could be used to determine if an AND-OR compound logical test is to be performed, and bit 30 could be used to determine if an AND or and OR logical test is to be performed if the AND-OR test bit is not set.

Where simple logical tests typically compare bits of an event group against bits of a test mask, complex logical tests typically compare the results of other logical tests. In order to set forth such complexities in a single test mask, a predefined organization structure dictating predefined bit patterns could be used to separate one level of a logical test with another level of a logical test. A simple organization structure for an AND-OR operation is one which dictates that groups of set bits represent a group of AND operations while an unset bit represents an OR operation. For example, a test mask of 10111011, where the most significant $7^{th}$ bit represents whether an AND-OR complex logical test is to be performed, symbolizes that the two least significant bits should be compared with an AND operation, the 3 next significant bits should be compared with an AND operation, and the results of both operations should be compared with an OR operation. The spacer bit between the 111 and the 11 bits represents the OR operation between the two AND operations. By encoding predefined bit patterns (such as spacer bits) within the event group test mask, the test mask lacks bitwise alignment with respect to the event group bits.

Since the test mask lacks bitwise alignment with respect to the event group bits, and logical tests need to be performed against masks that have bit alignment with the event group, one or more submasks are typically generated as a function of the event group test mask. For example, with the test mask of 10111011, which tests an AND of the 0 and 1 bits, an AND of the 2, 3, and 4 bits, and tests an OR of the results of both AND operations, a submask of 00000011 could be created to test the 0 and 1 bits while a submask of 00011100 could be created to test the 2, 3, and 4 bits against one another. When each bit aligned submask is compared in an AND operation with the event group, a partial result is derived, where a partial result that matches the submask would result in a true condition, while a partial result that does not match the submask would result in a false condition.

Since the organization structure uses spacer bits and flag bits to represent operations to be performed, the test mask preferably has a greater number of bits than the event group in order to represent operations for all of the bits of the event group. For example, if an event group is 8 bits long, the test mask is preferably at least 16 bits long. If an event group is 16 bits long, the test mask is preferably at least 32 bits long.

Whatever the compound logical test dictated by the event group test mask, the computer system generates a test result as a function of the event group test mask and the event group, and encodes the test result in the memory of the computing device.

Various objects, features, aspects and advantages of the inventive subject matter will become more apparent from the following detailed description of preferred embodiments, along with the accompanying drawing figures in which like numerals represent like components.

One should appreciate that the disclosed techniques provide many advantageous technical effects including enabling a complex logical test to be encoded within a single test mask and conveniently testing for a plurality of conditions with a small number of inputs.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

FIGS. 6A and 6B show exemplary code that could be used to perform the exemplary computations shown in FIGS. 3-5.

FIG. 8 shows exemplary code that could be used to ensure that event flags are mutually exclusive.

DETAILED DESCRIPTION

The inventive subject matter provides apparatus, systems, and methods in which a non-transitory computer readable medium product, such as a real-time operating system ("RTOS"), processes compound logical tests from an event group test mask that lacks bitwise alignment with event group bits.

Figure 1:
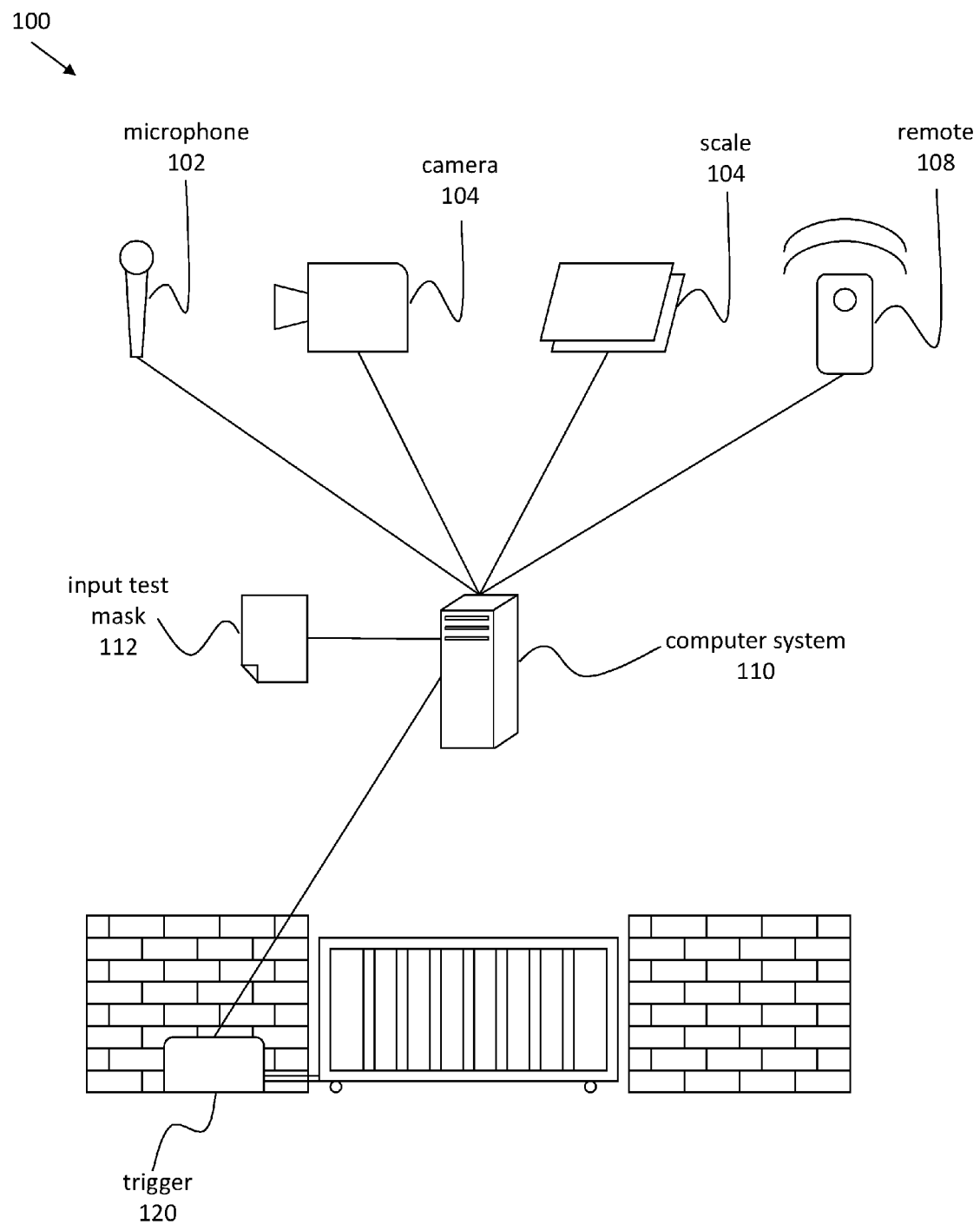
FIG. 1 is a hardware schematic of an exemplary inventive system.

In FIG. 1, an inventive logical test system 100 has event triggering devices 102, 104, 106, and 108, computer system 110, test mask 102, and trigger 120. While the inventive logical test system is typically embodied within an RTOS where events are usually triggered by computational thresholds and results of logical tests usually result in a numeric value, the physical inventive logical test system 100 is provided here euphemistically to better illustrate the features of the inventive subject matter.

Event triggering device 102 is shown as a microphone that detects sounds above a given threshold, event triggering device 104 is shown as a camera that detects movement within a given area, event triggering device 106 is shown as a scale that detects a weight on the scale, and even triggering device 108 is shown as a remote control that sends a signal to computer system 110. Each of these event triggering devices could be in one of two states: on or off. A binary representation would represent the off state as the number 0 and the on state as the number 1. Thus, when event triggering device 102 detects a sound above the given threshold, event triggering device 102 will send a "1" signal to computer system 110. When event triggering device 103 detects a movement within a given area, event triggering device 103 will send a "1" signal to computer system 110. When event triggering device 104 detects a weight on the scale, event triggering device 104 will send a "1" signal to computer system 110. Lastly, when event triggering device 104 detects pressure on its button, event triggering device 104 will send a "1" signal to computer system 110. In some embodiments, the absence of a signal constitutes a "0" signal, while in other embodiments, each device could send a "0" signal to computer system 110 in the absence of the corresponding trigger.

Computer system 110 then reviews the event triggers and will perform a logical test based upon an input test mask 102. Such a test mask could be, for example, a test of (1) whether all 4 conditions are met simultaneously, (2) whether only one condition is met, or (3) whether both the conditions from triggering devices 102 and 104 are met or both the conditions from triggering devices 106 and 108 are met. Where the test mask represents a simple logical test, such as an OR operation with a set of test mask bits or an AND operation with a set of test mask bits, the test mask's test bits are typically aligned with the event group bits. However, where the test mask represents a complex logical test, such as an AND-OR operation, the test mask's bits are typically not aligned with the event group bits since one or more spacer bits (typically a 0 bit) will need to be used to convey the complex logical test. Whatever the logical test, the computer system will open a gate by sending a trigger signal to trigger 120, or will keep the gate closed by not sending a trigger signal to trigger 120.

As previously stated, typical real-time operating systems use internal threshold tests to trigger changes in an event group's bits, one or more functions to perform the logical tests in accordance with the test mask, and output the result to a separate function. The software instructions on the computer readable medium product are typically configured to execute the step of encoding an event group comprising adjacent bits within the memory of the computing device. For example, if an event group comprises adjacent bits ABCD, and the computing device is configured to encode bit A to be on, bit B to be off, bit C to be on, and bit D to be off, ABCD could be represented as 1010. Event groups could comprise any number of bits, but are typically at least four adjacent bits numbering as a power of two, such as 8 bits, 16 bits, 32 bits, 64 bits, 128 bits, 256 bits, 512 bits, 1024 bits, 2048 bits, or 4096 bits.

An event group test mask is also typically encoded by the operating system, which represents a compound logical test that targets specific event group flags. As used herein, a "compound logical test" is a logical test that has at least two or three levels of operations. For example, a compound logical test could comprise the operations AB+CD, otherwise read as (A AND B) OR (C AND D). The AND operations are performed at one level, and then the results of the two AND operations are compared with an OR operation at a second level. Additional levels are possible, for example (AB+CD)E could be a three-level operation, otherwise read as ((A AND B) OR (C AND D)) AND E. In this example, the operation A AND B and the operation C AND D are performed on one level, the results of which are compared with an OR operation on a second level, and the result of that OR operation is compared with an AND operation against E on a third level.

In order to convey a compound logical test within a single event group test mask, a test flag indicating whether the test mask encodes a single logical test (e.g. an AND operation against the test mask or an OR operation against the test mask) or a compound logical test (e.g. an AND-OR two-tiered logical test) is preferably encoded within the test mask. A compound logical test also generally lacks bitwise alignment with respect to the event group bits.

The discussion, which follows, applies to "big-endian" systems (i.e., those for which the most significant bit of a value appears first in memory. In this case, we refer to searching from right to left. However, the following technique equally well supports "little endian" systems in which the least significant bit of a value appears first in memory. In this case we think of searching from left to right. In either case the search typically begins with the least significant bit. Furthermore, the examples given are for 8 bits for clarity and can easily be extended to larger or small values (e.g., 4 bits, 16 bits, 32 bits, 64 bits, 128 bits, etc.).

Figure 2:
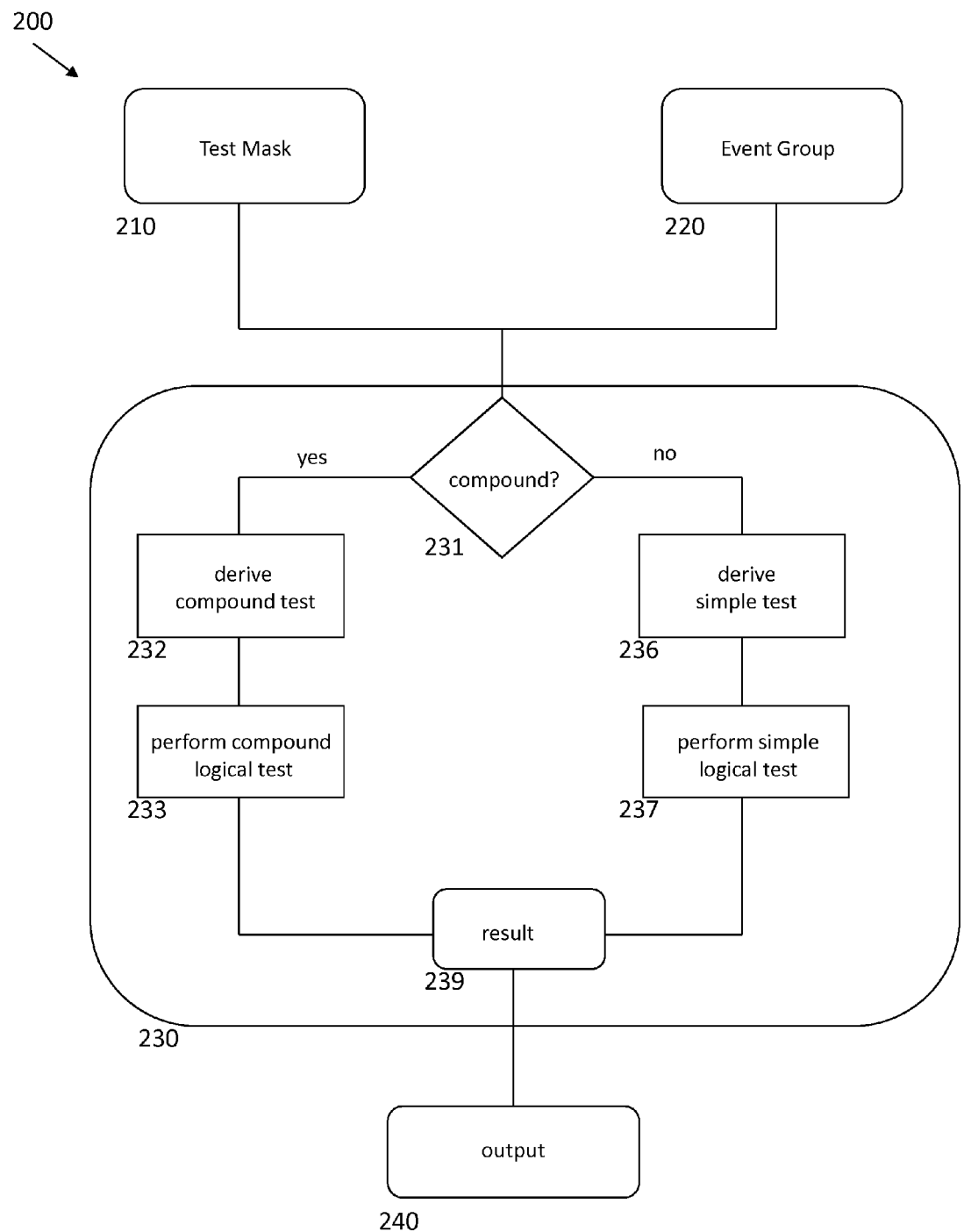
FIG. 2 is a software flowchart of an exemplary inventive module.

FIG. 2 shows a flowchart 200 that visually explains how an operation system typically processes an event group with its test mask. A typical logical test module 230 has two inputs: test mask 210 and event group 220. In step 231, a module analyzes test mask 210 to determine whether test mask 210 comprises a compound logical test or comprises a simple logical test. If test mask 210 comprises a compound logical test, then in step 232 the module derives the compound test. In some embodiments with only a single type of compound logical test, one or more bits of the test mask are used to indicate, with a "1" or a "0", whether test mask 210 represents a compound logical test. In some embodiments with a plurality of types of compound logical tests, one or more bits of the test mask could indicate, with a "1" or a "0", whether test mask 210 represents a compound logical test, and other one or more bits of the test mask could indicate the type of test. Typically the bit(s) used is the most significant bit(s), since the less significant bits are typically used for the value of the test mask itself.

Once the type of compound logical test is determined, the module derives the compound logical test in step 232 by analyzing every bit of the remaining test mask. The "remaining" test mask is the portion of the test mask that does not include the bits that are used to indicate the type and existence of the compound logical test.

In one embodiment, where the test mask represents an AND-OR test, every grouping of "1"s in the test mask separated by a "0" spacer bit represents an AND group that compared with the other AND groups using an OR operation. According to this embodiment, a test mask whose remaining bits are 000000111011011 would represent (A&B&C)+(D&E)+(F&G) where G represents the least significant bit of the event group. Likewise, a test mask whose remaining bits are 000000101101011 would represent A+(B&C)+D+(E&F) where F represents the least significant bit of the event group. Such a test mask represents a compound logical test of two levels of operations.

In another embodiment, where the test mask represents an AND-OR-AND test, a grouping of "1"s in the test mask represent an AND group, a "0" spacer represents an OR operation, and a "00" spacer represents an AND operation between groups of OR operations. According to this embodiment, a test mask whose remaining bits are 000101110011011 would represent (A+(B&C&D))&((E&F)+(G&H)) where H represents the least significant bit of the event group. Such a test mask represents a compound logical test of three levels of operations.

Once the compound logical test has been derived from the test mask, the module performs the compound logical test on event group 220 in step 233 to calculate the result in step 239.

The result is then output to an output function 240, which is typically the function that calls the module.

In embodiments where the test mask 210 fails to have a set bit that indicates that the test mask is a compound logical test, the module derives the simple test in step 236. Typical simple logical tests are an AND logical test and an OR logical test. Such a test could be represented in test mask 210 by the next most significant bit to the right of the most significant bit which indicated that test mask 210 is not a compound logical test. Such a bit could have a "1" represent an AND simple logical test and a "0" represents an OR simple logical test. The remaining bits could then be compared to event group 220 in step 237, where the module performs the simple logical test to obtain result 239, which is then sent to output 240.

Compound Logical Testing (AND-OR Testing)

Compound logical testing of event groups is a logical operation which could represented as: AB+CD, which means ((A AND B) OR (C AND D)). The terms AB and CD are called AND terms. AND terms are separated by an OR operator (+). Such technology works by requiring that AND terms be separated by spacer bits, which can be 0, in the test mask. In addition a higher bit, say bit 9, if 1, means to test for AND-OR and it overrides the AND flag discussed previously. Hence, to test for AB+CD, the test flag is b1000011011. AB is identified by bits 4 and 3; CD is identified by bits 1 and 0. Bit 2 serves solely as a spacer and is not involved in the testing.

The method to implement such compound logical operations, generally starts at the right end of the test mask and searches left for the first 1 to identify the start of the first AND term. The method then searches for the first 0; it accumulates a submask of 1's delineating the AND term. When done, the method identifies which flags should be compared using an AND logical test and the logic tests if they are. If not, the method searches for the next AND term, accumulates a submask and tests it against the flags. In this process, the 0 bits left of the first AND term in the submask serve only as spacers and are discarded so that each submask is properly aligned with the flags to be tested.

This method can handle any AND-OR flag combination up to the size of the flags portion of the mask. For the 8-bit example, above, it could test for AB+CD+EF, or A+BCD+EF, both of which require 8 flag bits. Note that an AND term can include of a single flag. Also, this algorithm can be adapted to allow testing the full number of flag bits by making the test mask larger by the number of spacers bit that are included. For example, to test AB+CD+EF+GH, where A thru H comprise 8 flag bits stored in a byte, the mask would require 11 bits, which could be stored in a 16-bit value. In this case, we would probably choose for bit 15 to be the AND-OR flag and bit 14 to be the AND flag. So bits 11 thru 13 would be unused. Then the mask would look like: b1000011011011011

One unique aspect of this technology is the method for defining the test mask by using 0 bits to separate AND terms in the mask, even though it would seem that this would result in the AND mask terms becoming misaligned with the flags they were supposed to test. This is avoided by using the 0 bit only to delineate AND term boundaries and by accumulating submasks, which are properly aligned with the flags they are to test.

It should be noted that these disclosed techniques are not a universal solution to all mathematically possible compound logic problems. This is because the flags in the test mask must be in a similar order as the actual flags. For example, assuming flags are in order of ABCD, then it is possible to test for AB+CD, CD+AB, or BA+CD, but not AD+BC because the A and D flags are separated from each other in the event group as are B and C. The mask b11011 suffices for the first 3 cases because the AND term flags are neighbors, but the mask does not work for the fourth set. This technique makes a trade-off between complexity and need. It satisfies reasonable needs in event groups for compound logic tests without overly complicating the code or memory required. This is important because complex code runs slower and is more difficult to use. Although the solution is not a universal solution, such a restriction is not considered limiting because an embedded system developer is able to assign flags to real-world conditions during development of the system. Thus, the developer is able to arrange or group flags as desired.

Figure 3:
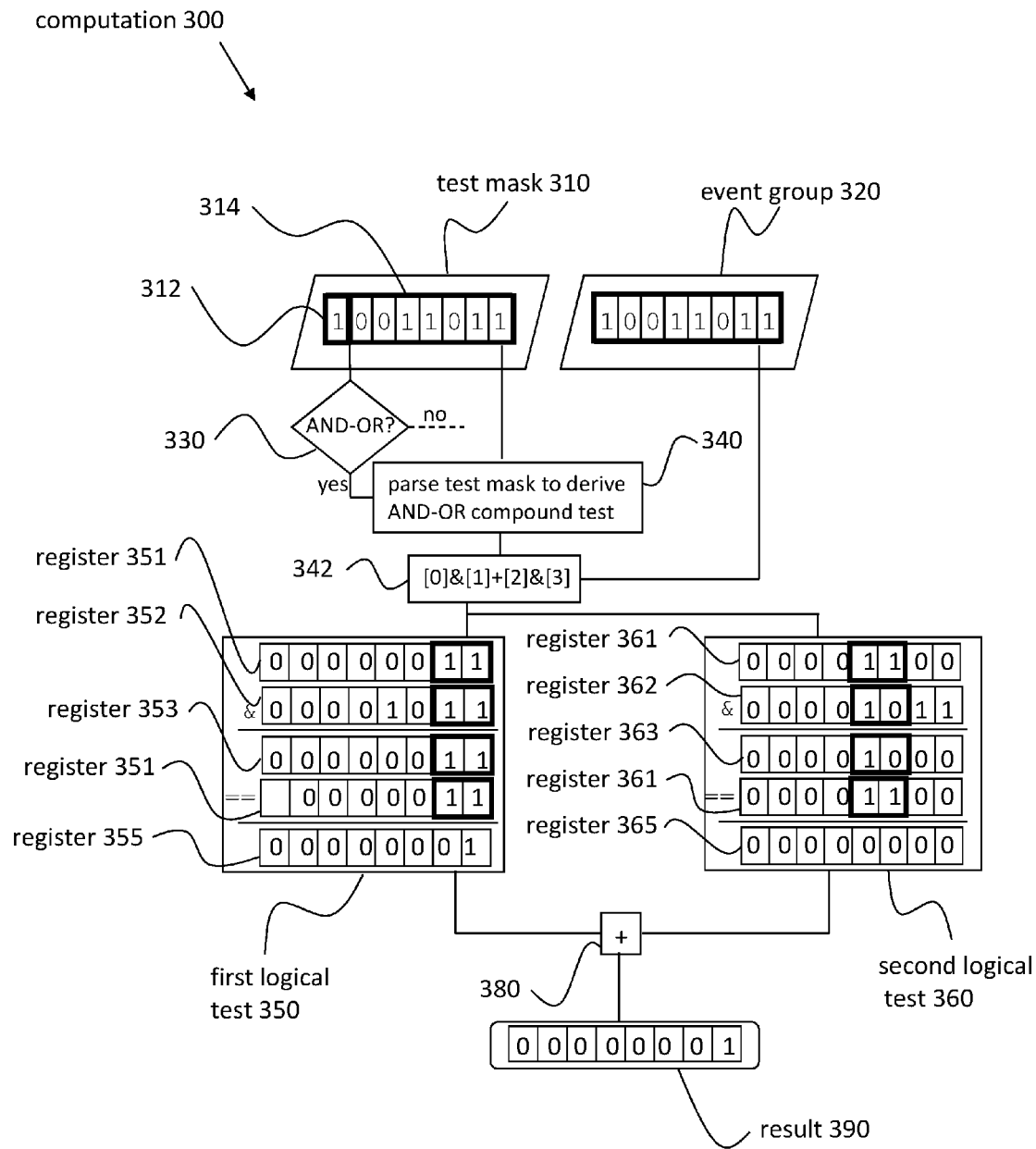
FIG. 3 shows an exemplary computation to perform a compound logical test.
Figure 4:
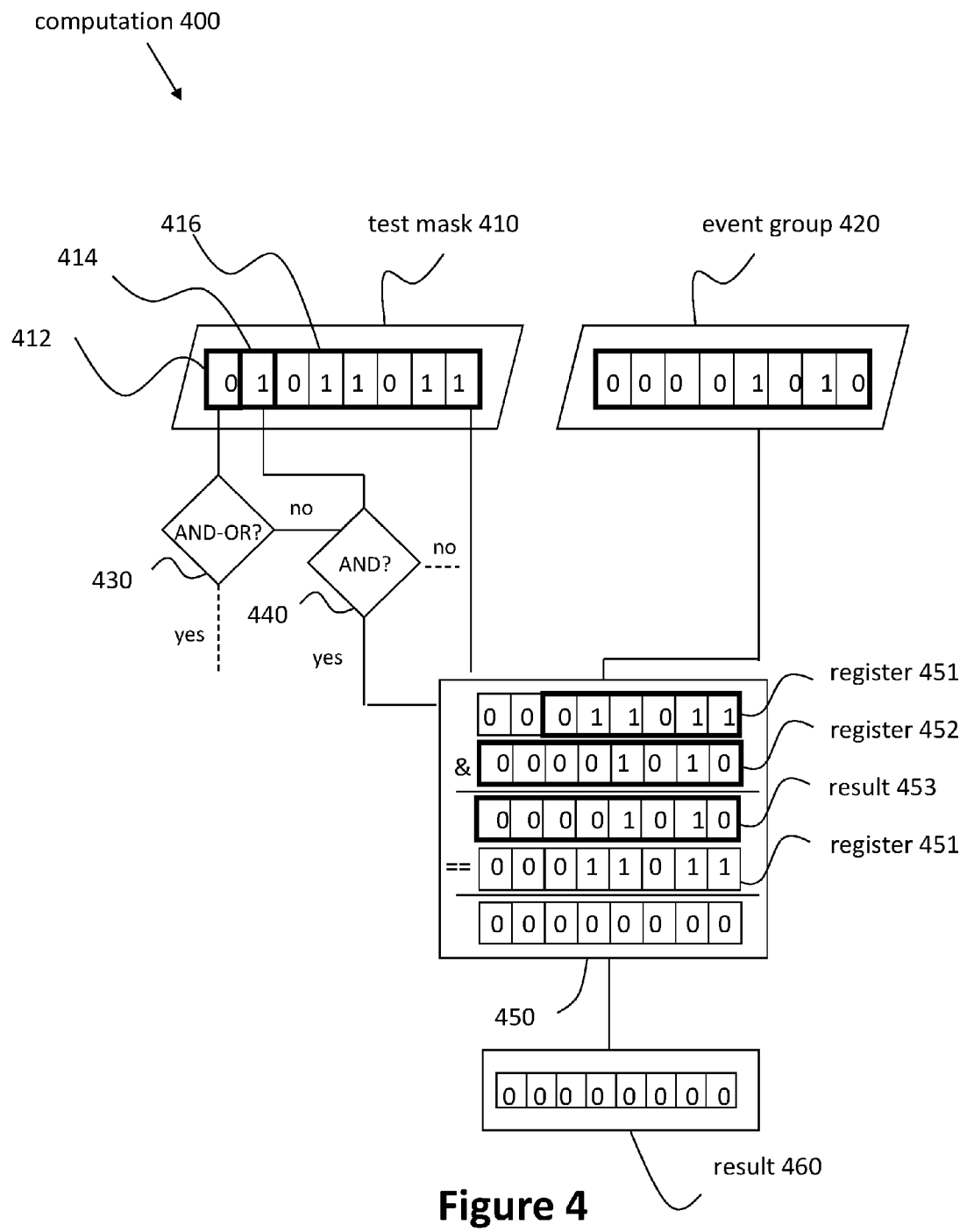
FIG. 4 shows another exemplary computation to perform a simple logical test.
Figure 5:
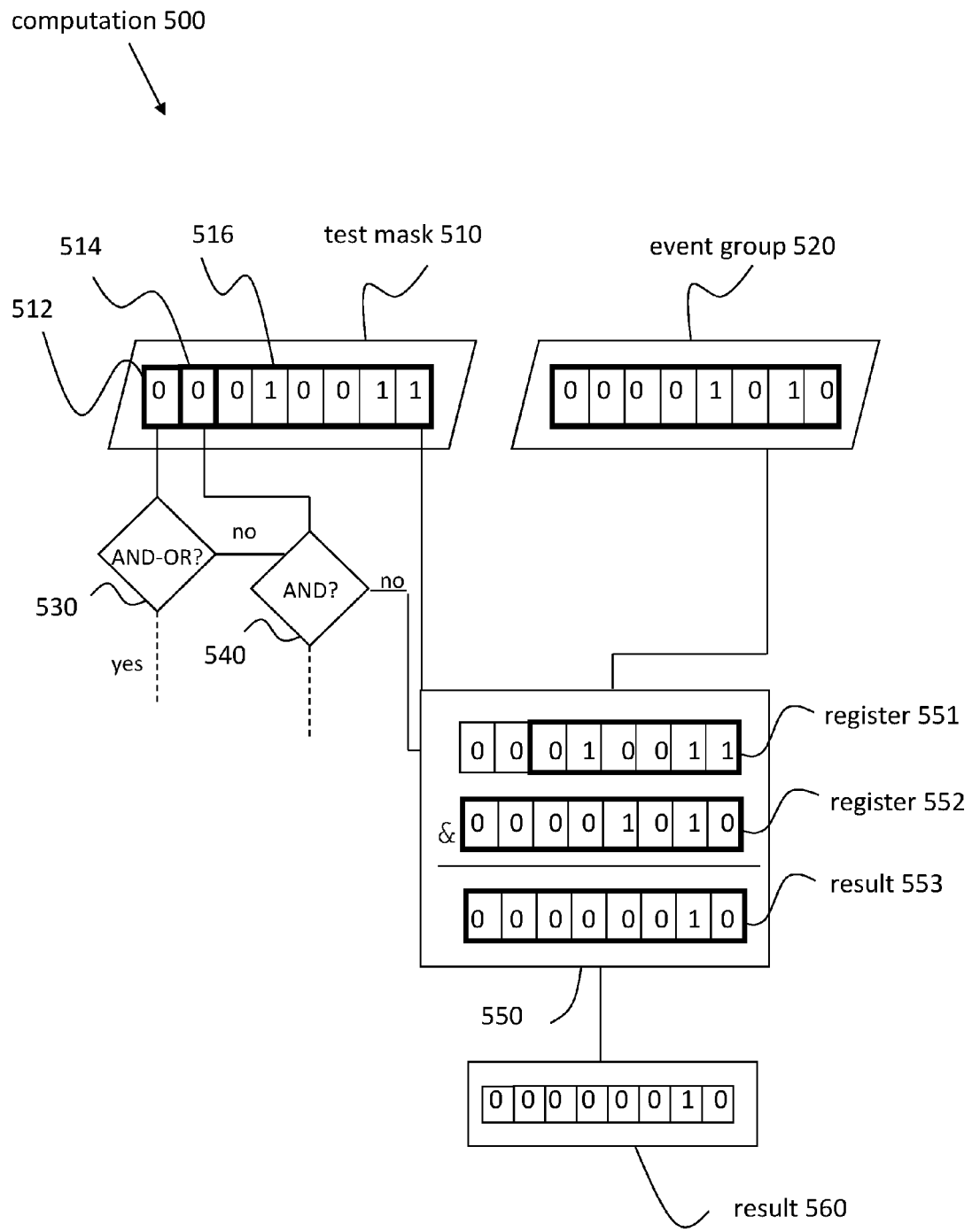
FIG. 5 shows another exemplary computation to perform a simple logical test.

FIGS. 3-5 contain examples of the computations performed by an exemplary module that uses the most significant bit to represent the existence of an AND-OR compound logical test, and uses the next most significant bit to represent the type of simple logical test used where the test mask does not represent a compound logical test.

FIG. 3 illustrates the steps of an exemplary AND-OR computation 300. Computation 300 has an input 8-bit test mask 310 encoded in a first 8-bit register as 10011011, and has an input 4-bit event group 320 encoded in a second 8-bit register as 00001011. The four most significant zeros in the second 8-bit register are, for all intents and purposes, empty placeholders. In step 330, the module examines at the most significant bit 312 of input test mask 310 to determine whether input test mask 310 is an AND-OR compound logical test. Since the most significant bit 312 is set, the module determines that input test mask 310 is an AND-OR compound logical test and proceeds to step 340 to parse the test mask to derive the AND-OR compound test. Reading the remaining bits 314 of test mask 310 from right to left, the parser determines that bits [0] and [1] are compared using an AND logical test (since bits [0] and [1] of remaining bits 314 are set), bits [2] and [3] are compared using an AND logical test (since bits [3] and [4] of remaining bits 314 are set), and the results are then compared using an OR logical test (since set bits [0] and [1] and set bits [3] and [4] are separated by a reset bit [2]).

Next, the module proceeds to perform a first logical test 350 to perform the AND between bits [1] and [0] of event group 320 and a second logical test 360 to perform the AND logical test for bits [2] and [3] of event group 320. In the first logical test 350, bits [1] and [0] of remaining bits 314 are extracted to a first register 351 to create a sub test mask from remaining bits 314. The bits of event group 320 are extracted to a second register 352. An AND logical test is performed on registers 351 and 352 to create intermediary result 353. Intermediary result 353 is then compared against the first register 351 to determine if they are equal to one another. Since intermediary result 353 is equal to first register 351, first logical test 350 computes a final result 355, which is "1". Thus, the logical AND of bits [0] and [1] of event group 320 results in "1".

In the second logical test 360, the next group of set bits—bits [3] and [4] of remaining bits 314—are extracted into a first register 361 to create a sub test mask from remaining bits 314. The bits of first register 361 are now aligned with event group 320 in a manner that remaining bits 314 were not aligned. The bits of event group 320 are extracted into a second register 362. An AND logical test is performed on registers 361 and 362 to create intermediary result 363. Intermediary result 363 is compared against first register 361 to determine if they are equal to one another. Since intermediary result 363 is not equal to first register 361, second logical test 360 computes a final result 365, which is "0". Thus, the logical test of bits [2] and [3] of event group 320 results in "0".

After the first logical test 350 and the second logical test 360 are performed, the results those logical tests (result 355 for logical test 350 and result 365 for logical test 360) are then compared using an OR logical test 380 to obtain final result 390, which is a "1".

FIG. 4 illustrates the steps of an exemplary AND computation 400. Computation 400 has an input 8-bit test mask 410 encoded in a first 8-bit register as 01011011, and has an input 0-bit event group 420 encoded in a second 8-bit register as 00001011. The four most significant zeros in the second 8-bit register are, for all intents and purposes, empty placeholders. In step 430, the module examines at the most significant bit 412 of input test mask 410 to determine whether input test mask 410 is an AND-OR compound logical test. Since the most significant bit 412 is reset, the module determines that input test mask 410 is not an AND-OR compound logical test. Next, in step 440 the module examines the next most significant bit 414 of input test mask 410 to determine whether input test mask 410 is an AND logical test or an OR logical test. Since the next most significant bit 414 is set, the module determines that input test mask 410 is an AND logical test, and proceeds to step 450 to compare the remaining bits 416 of test mask 410 against the event group 420.

In logical test 450, the remaining bits 416 of the input test mask 410 are extracted to a first register 451 to create a sub test mask from test mask 410. The bits of event group 420 are extracted to a second register 452. An AND logical test is performed on registers 451 and 452 to create result 453, which is then compared against the first register 451. Since registers 453 and 451 are not equal to one another, which is then output as result 460. Since none of the bits in result 460 are set, the result of the AND simple logical test results in a zero, or false, result.

FIG. 5 illustrates the steps of an exemplary OR computation 500. Computation 500 has an input 8-bit test mask 510 encoded in a first 8-bit register as 00010011, and has an input 4-bit event group 520 encoded in a second 8-bit register as 00001011. The four most significant zeros in the second 8-bit register are, for all intents and purposes, empty placeholders. In step 530, the module examines at the most significant bit 512 of input test mask 510 to determine whether input test mask 510 is an AND-OR compound logical test. Since the most significant bit 512 is reset, the module determines that input test mask 510 is not an AND-OR compound logical test. Next, in step 540 the module examines the next most significant bit 514 of input test mask 510 to determine whether input test mask 510 is an AND logical test or an OR logical test. Since the next most significant bit 514 is reset, the module determines that input test mask 510 is an OR logical test, and proceeds to step 550 to compare the remaining bits 516 of test mask 510 against the event group 520.

In logical test 550, the remaining bits 516 of test mask 510 are extracted to a first register 551 to create a sub test mask from test mask 510. The bits of event group 520 are extracted to a second register 552. An AND logical test is performed on registers 551 and 552 to create result 553, which is then output as result 560. Since one of the bits (bit [1]) in result 560 is set, the OR simple logical test is proved to be a non-zero, or true, result.

FIGS. 6A and 6B provide exemplary code to show how an RTOS might represent a system that is capable of performing computations 300, 400, and 500. FIG. 6A illustrates a general test function, called smx_EventFlagsTest_F(eg, test_mask, post_clear_mask, timeout) that tests flags in an input event group "eg" against an input test mask "test_mask". If an AND-OR logical test is detected, function and/or_test(flags, test_mask) illustrated in FIG. 6B is called, which tests the event group "flags" against the "test_mask". If an AND-OR logical test is not detected, the function performs an AND test or an OR test, depending upon if the next significant bit is set.

The ability for a computer system to quickly perform an AND-OR test using a single test mask is particularly useful in event groups that have mutually exclusive flags. As used herein, "mutually exclusive flags" is a group of flags which cannot be activated simultaneously. The system preferably ensures that flags are mutually exclusive by only allowing flags to be set through functions that first reset all other mutually exclusive flags before one of the mutually exclusive flags is set. For example, where bits A and B are mutually exclusive, the system is preferably configured such that bit B must be reset to 0 when bit A is set to 1, and vice-versa. Where bits A, B, and C are mutually exclusive, the system is preferably configured such that bits B and C are both reset to 0 when bit A is set to 1.

Mutually Exclusive Flags

Examples are provided herein to better illustrate how an RTOS might use mutually exclusive flags. A variable such as M represents the TRUE (e.g., 1) state of variable M and a variable such as nM to represents the FALSE (e.g., 0) state of variable M. This kind of representation is commonplace in computer code. A logic treatise might provide M and ~M, respectively. However since~is a reserved symbol in many computer languages it is better to refer to both states as M and nM.

The way that event groups work, only bits that are set (=1) can be tested. It is not possible to test bits that are reset (=0). Hence, two bits are required to represent a binary flag. For example, M represents can represent an "on" state of M and nM represents its "off" state. M could be represented by bit 3 in an event group and nM could be represented by bit 1 in the same event group. M might mean the system is in operating mode and nM could mean that the system it is not in operating mode. In order to test event A if in operating mode or test event B if in non-operating mode, the logic would be MA+nMB. This can be handled by the AND-OR testing described above. Note that since M and nM could accidently be true at the same time, further configuration of the computer system is necessary to prevent such accidents.

Figure 7A:
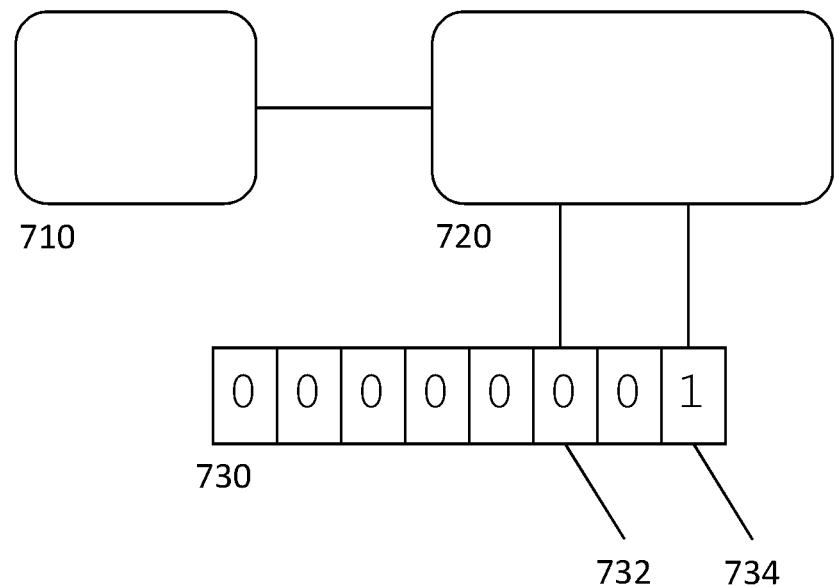
FIGS. 7A and 7B show software schematics illustrating a mutually exclusive module trigger.
Figure 7B:
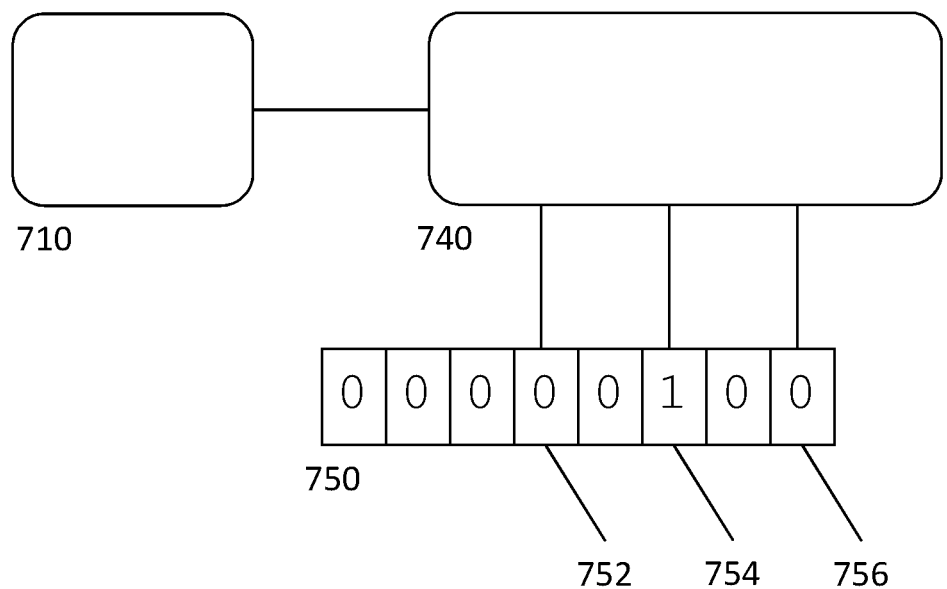

FIGS. 7A and 7B provide exemplary modules that are used to set mutually exclusive flags. In FIG. 7A, module 710 is used to send a command to set a mutually exclusive flag in event group 730. Bits 732 and 734 in event group 730 are mutually exclusive. Module 720 is the only module that is allowed to access and change bits 732 and 734 in event group 730. Thus, in order to set bit 734, module 710 must send a command to module 720 to set bit 734. Module 720 then receives the command to set bit 734 and resets bit 732 while setting bit 734. If module 710 then sends a command to set bit 732, module 720 would then reset bit 734 while setting bit 732. By ensuring that only module 720 has the ability to set mutually exclusive flags, the system ensures that such flags remain mutually exclusive.

In FIG. 7B, module 710 is against used to send a command to set a mutually exclusive flag, this time in event group 750. Its 752, 754, and 756 are mutually exclusive. Module 740 is the only module that is allowed to access and change bits 752, 754, and 756. Thus, in order to set bit 756, module 710 must send a command to module 740 to set bit 756. Module 740 then receives the command to set bit 756, and resets both bits 752 and bit 754 while setting bit 756. If module 710 then sends a command to set bit 752, module 740 would then reset both bits 754 and 756 while setting bit 752. By ensuring that only module 740 has the ability to set mutually exclusive flags, the system ensures that such flags remain mutually exclusive.

A group of mutually exclusive flags could range from two members to any number of members, limited only by the size of the event group. Likewise, an event group could also have any number of groups of mutually exclusive flags, likewise limited by the size of the event group. Each group of mutually exclusive flags generally has a system set up in place to ensure that no two members of the group are set simultaneously. Such a system could be, for example, a system architecture that ensures that only a certain module accesses the group of flags, or a system that ensures that any function that sets one of the mutually exclusive flags resets all of the other mutually exclusive flags in the group.

FIG. 8 provides exemplary code that could be used to ensure that flags remain mutually exclusive. Instead of providing a single module exclusive access to the flags, this function assures that flags remain mutually exclusive by forcing a user to provide any mutually exclusive flags when setting a flag in an event group. The function smx_EventFlagsSet(eg, set_mask, pre_clear_mask) sets the flags defined by "set mask" in event group "eg" while also resetting the flags defined by "pre_clear_mask."

So, for example, to set flag M, where M and nM are mutually exclusive flags, a user would call EventFlagsSet (eg, M, nM). In this situation, nM is first cleared, and then M is set. Thus, both can never be true at once.

In another example, where X, Y, and Z are mutually exclusive and a user wishes to set flag X, the user would call EventFlagsSet (eg, X, Y+Z). In this situation, Y and Z are both first cleared, and then X is set. Thus, each of X, Y, and Z can never be simultaneously true. So long as the user always inputs the other mutually exclusive flags when setting one of the flags, the flags remain mutually exclusive.

A useful example of using mutually exclusive flags would be to provide "mode" flags as mutually exclusive flags in an event group, and "event" flags as non-mutually exclusive flags in an event group. A mode flag could represent a mode of operation. For example, a system might be in STARTUP mode, RUN mode, or SHUTDOWN mode, each of which tends to have a long persistence. An event flag represents an event, such as a bottle passing a sensor on a conveyor belt, or an "abort" key being pressed by a user. Typically, an event flag is reset as soon as it is recognized, so the next event is not missed. Hence event flags have very low persistence. The significance of this event could vary depending upon the mode of the system. Perhaps the bottle passing is important only in RUN mode and should be ignored in the other modes, and the "abort" key being pressed is important only in SHUTDOWN mode and should be ignored in other modes. To test for the existence of both events, an AND-OR logical test could be used. An event group ABCD, where "A" represents a RUN mode, "B" represents a "bottle passing" event, "C" represents a SHUTDOWN mode, and "D" represents an "abort" key bring pressed. The AND-OR test AB+CD would then return true only if a bottle passed while the system was in RUN mode or if the "abort" key was pressed while the system was in SHUTDOWN mode.

One serious weakness of current known RTOS event groups is their inability to deal with mode flags and event flags together. As shown in the above examples, it can be useful to test for different events when in different modes. Doing so requires combining the above described techniques and is a practical application of this combination. In particular, state machines must be in only one state at a time. Hence, states can be represented by mode flags. Then the events which trigger state transitions can be represented by event flags.

An event group could also comprise two or more bits which are mutually exclusive flags. As used herein, a selection of bits which are mutually exclusive flags are configured such that only one bit of the selection of bits can be set at a time. For example, if an event group consists of bits AB, and bits A and B are mutually exclusive flags, then the event group could be configured as 00, 10, or 01, but cannot be configured as 11. Or if an event group consists of bits ABC, and all bits are mutually exclusive flags, then the event group could be configured as 000, 100, 010, 001, but not 110, 011, 101, or 111.

In order to ensure that a selection of bits is mutually exclusive, the system is preferably configured such that, when setting one of the selection of bits, all other bits are reset. For example, in the AB example above, when the A bit is set, B is reset, or in the ABC example above, when the B bit is set, the A and C bits are reset. By imposing a configuration that forces all other bits in the selection to be reset when a bit is set, the system ensures that the flags are mutually exclusive.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A non-transitory computer readable medium product configured to store software instructions that enable at least one processor in a computing device having a memory to execute the steps of:
   encoding of an event group comprising adjacent bits within the memory of the computing device;
   encoding an event group test mask comprising bits representing a compound logical test targeting specific event group flags, wherein the test mask lacks bitwise alignment with respect to the event group bits;
   generating a test result for the compound logical test as a function of the event group test mask and the event group; and
   encoding the test result in the memory of the computing device.

2. The product of claim 1, wherein the step of encoding the event group test mask includes encoding at least one of the following within the event group test mask: an AND-OR test flag and an AND test flag.

3. The product of claim 1, wherein the event group comprises at least X adjacent bits, where X is at least four.

4. The product of claim 3, wherein X is selected from the group consisting of: 8 bits, 16 bits, 32 bits, 64 bits, 128 bits, 256 bits, 512 bits, 1024 bits, 2048 bits, and 4096 bits.

5. The product of claim 1, wherein the event group test mask comprises a greater number of bits than the event group.

6. The product of claim 1, wherein the event group test mask comprises at least one spacer bit.

7. The product of claim 1, wherein the compound logical test includes at least one AND operation and at least one OR operation.

8. The product of claim 1, wherein the step of generating the test result includes deriving at least one sub test mask as a function of the event group test mask.

9. The product of claim 8, further comprising deriving a partial result based on the at least on submask.

10. The product of claim 8, wherein the at least one submask is bit aligned with the event group bits.

11. The product of claim 1, wherein the event group comprises a first bit and a second bit representing mutually exclusive flags.

12. The product of claim 11, wherein the step of encoding the event group comprises resetting the second bit when the first bit is set.

13. The product of claim 11, wherein the step of encoding the event group comprises resetting the first bit when the second bit is set.

14. The product of claim 11, wherein the compound logical test comprises a first logical test as a function of the first bit and a second logical test as a function of the second bit.

15. The product of claim 14, wherein the first logical test is an AND operation and the second logical test is an AND operation.

16. The product of claim 15, wherein the compound logical test further comprises an OR operation comparing the results of the first logical test and the second logical test.

17. The product of claim 1, wherein the compound logical test comprises at least two levels of operations.

18. The product of claim 1, wherein the compound logical test comprises at least three levels of operations.

* * * * *